(12) United States Patent
Zhang et al.

(10) Patent No.: US 12,619,208 B2
(45) Date of Patent: May 5, 2026

(54) SOFTWARE COMPATIBILITY PREDICTION AND REMEDIATION FOR INDUSTRIAL SYSTEMS

(71) Applicant: ROCKWELL AUTOMATION TECHNOLOGIES, INC., Mayfield Heights, OH (US)

(72) Inventors: Kerwen Changyuan Zhang, Dalian (CN); Davis Biao Ma, Dalian (CN); Courtney D. Picou, Chagrin Falls, OH (US); Angela Hexiao Leng, Dalian (CN); Leon Tengfei Liang, Dalian (CN); July Lei Zhu, Dalian (CN)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 494 days.

(21) Appl. No.: 18/123,635

(22) Filed: Mar. 20, 2023

(65) Prior Publication Data

US 2024/0319697 A1     Sep. 26, 2024

(51) Int. Cl.
  *G05B 19/04*        (2006.01)
  *G05B 19/042*       (2006.01)
  *G05B 23/02*        (2006.01)

(52) U.S. Cl.
  CPC ..... *G05B 19/0423* (2013.01); *G05B 23/0216* (2013.01)

(58) Field of Classification Search
  CPC ... G05B 19/0423; G05B 23/0216; G06F 8/65; G06F 8/71
  See application file for complete search history.

(56) References Cited

U.S. PATENT DOCUMENTS

| 2010/0131939 A1* | 5/2010 | Hieb | G06F 8/73 |
| | | | 717/169 |
| 2014/0344799 A1* | 11/2014 | Thodati | G06F 8/65 |
| | | | 717/171 |

(Continued)

OTHER PUBLICATIONS

Rockwell Automation, Compatability & Downloads, Retrieved from https://compatibility.rockwellautomation.com/Pages/home.aspx, Version Accessed on Aug. 1, 2024, 2 pages.

(Continued)

*Primary Examiner* — Christopher W Carter
(74) *Attorney, Agent, or Firm* — Quarles & Brady LLP

(57)        ABSTRACT

Systems and methods for software compatibility prediction and remediation for industrial systems. One system includes an electronic processor configured to receive a software inventory for an industrial system and compatibility data associated with each piece of software included in the software inventory. The electronic processor is also configured to generate, via a compatibility engine, a compatibility mapping based on the software inventory and the compatibility data. The electronic processor is also configured to determine, based on the compatibility mapping, a set of compatibility statuses associated with the industrial system. The electronic processor is also configured to generate a graphical user interface (GUI) for display, the GUI including the software inventory, the set of compatibility statuses, and an interactive graphical representation of the compatibility mapping, and, in response to receiving a user interaction with the GUI, dynamically update the GUI based on the user interaction.

20 Claims, 10 Drawing Sheets

(56) References Cited

U.S. PATENT DOCUMENTS

| | | | |
|---|---|---|---|
| 2015/0317235 A1* | 11/2015 | Lachambre | G06F 11/3612 |
| | | | 717/126 |
| 2017/0336947 A1* | 11/2017 | Bliss | G06Q 10/087 |
| 2019/0259078 A1* | 8/2019 | Firman | G06Q 30/0621 |
| 2021/0081189 A1* | 3/2021 | Nucci | H04L 41/20 |

OTHER PUBLICATIONS

Siemens, Compatibility Tool for Automation and Drive Technology, Retrieved from https://support.industry.siemens.com/cs/document/64847781/compatibility-tool-for-automation-and-drive-technology?dti=0&Ic=en-WW, Version Accessed on Aug. 1, 2024, 5 pages.

* cited by examiner

400

405
RECEIVING A SOFTWARE
INVENTORY FOR AN INDUSTRIAL
SYSTEM

410
RECEIVING COMPATIBILITY
DATA

415
GENERATING A COMPATIBILITY
MAPPING FOR THE INDUSTRIAL
SYSTEM

420
DETERMINING A SET OF
COMPATIBILITY STATUSES FOR
THE INDUSTRIAL SYSTEM

425
GENERATING A GRAPHICAL USER
INTERFACE ("GUI")

430
UPDATING THE GRAPHICAL USER
INTERFACE ("GUI")

700

800

900

SOFTWARE COMPATIBILITY PREDICTION AND REMEDIATION FOR INDUSTRIAL SYSTEMS

SUMMARY

The following presents a simplified summary of the disclosed technology herein in order to provide a basic understanding of some aspects of the disclosed technology. This summary is not an extensive overview of the disclosed technology. It is intended neither to identify key or critical elements of the disclosed technology nor to delineate the scope of the disclosed technology. Its sole purpose is to present some concepts of the disclosed technology in a simplified form as a prelude to the more detailed description that is presented later.

The technology disclosed herein relates generally to industrial systems, and, more particularly, to software compatibility prediction and remediation for industrial systems.

Industrial systems (including one or more industrial devices) operate according to one or more pieces of software. The compatibility of the software executing within an industrial system can impact the performance and functionality of the industrial system. For instance, when software executed within an industrial system is incompatible, the industrial system may not perform according to specifications, may not be able to execute an industrial task, etc.

Currently, when a user wants to check software compatibility for their industrial system, the user generally has to search for each piece of software individually and manually within a software inventory. Such software inventories are generally large in size and complex. For instance, the software inventory often includes software not even implemented within the user's industrial system, includes multiple versions or variations of a piece of software, etc.

Additionally, while the software inventory may provide compatibility information for various pieces of software, a user may not be able to determine whether one piece of software is compatible with another piece of software based on the compatibility information provided within the software inventory. For instance, the user may not be able to determine compatibility until actually implementing the software on the user's industrial system. Such a trial-and-error approach may lead to industrial system downtime and, in some instances, damage to the industrial system.

Further, the software inventory may not take into account user-specific constraints associated with a user's industrial system, industry, etc. For instance, when the user is operating within the pharmaceutical industry (or another highly regulated industry), the user's industrial system may be constrained by a number of regulatory constraints (e.g., a regulatory entity's approval, etc.). As one non-limiting example, when a user wants to update a first piece of software from a first version to a second version and the user's industrial system also implements a first version of a second piece of software, the software inventory may indicate that the second version of the first piece of software is not compatible with the first version of the second piece software but is compatible with the second version of the second piece of software. However, the user may be constrained to the first version of the second piece of software, such as, e.g., when a regulatory agency approved a product manufactured using the first version of the second piece of software.

As such, current approaches are prone to human-error, expensive and time-consuming trial and error, industrial system downtime or damage, etc.

Some existing solutions include digital compatibility tools that check software compatibility, such as, e.g., web-based compatibility tools. However, these existing solutions still fail to solve the technical problems outlined above and, as such, may technical challenges remain with respect to software compatibility within the context of industrially systems and the field of industrial automation. For instance, existing compatibility tools still require manual entry of implemented (or on-premises) software in order to check compatibility. Additionally, existing compatibility tools do not support enterprise level compatibility checks (e.g., compatibility checks across multiple industrial systems, industrial sites, industrial processes, or geographical locations, etc.). For instance, when using existing compatibility tools, software compatibility is checked on an interactive basis (e.g., one piece of software at a time). Existing compatibility tools present information in a one-to-many manner. Thus, to collect meaningful information for a large system, a user iterates through many combinations. Existing compatibility tools do not present compatibility information in context of user's installed base or industrial system. Existing compatibility tools do not provide proper analysis of a user's actual implemented industrial system. Existing compatibility tools do not support or enable consideration of constrains (e.g., fixed constrains or variable constraints).

To solve these and other technical problems, the technology disclosed herein include methods and systems that provide software compatibility prediction and remediation for industrial systems. In some configurations, the technology disclosed herein may cross-check software implemented on industrial devices within an end user's (or customer's) industrial enterprise or system. In some configurations, the technology disclosed herein may determine compatibility of implemented software and list incompatible software. In some configurations, the technology disclosed herein may determine and provide compatibility solutions, including, e.g., automatic solutions or recommendations.

The technology disclosed herein provide several user-experience innovations to provide a better user experience. As one non-limiting example, a user does not have to enter existing installed software. Rather, in some configurations, the technology disclosed herein may automatically collect on-premises software information and present the on-premises software information in a meaningful way (e.g., in a useful context) that is tailored or customized to the user's industrial system, industry, etc.

As another non-limiting example, a user may use screen controls to adjust software and versions to explore different solution sets. Accordingly, in some configurations, the technology disclosed herein enables a user to perform (e.g., in real-time or near real-time) a virtual or simulated software upgrade to the user's industrial system without having to actually perform a software upgrade on the user's physical industrial system. As such, in some configurations, the technology disclosed herein enables a user to perform a simulated or virtual trial and error software upgrade process.

As yet another non-limiting example, the technology disclosed herein increases presentation speed of solution sets by, in some configurations, collecting solutions data in advance and persisting locally on a user device. For example, in some configurations installed software information is collected and all version compatibility data of the installed base software is downloaded from a software inventory (e.g., a remote software inventory) and persisted locally, behind the scenes, before a user interaction. Accordingly, in some configurations, by collecting solutions data in advance and persisting locally on the user device, solutions may be displayed instantly (or in real-time) without delays due to, e.g., processing solution data after upgrade requests, which enables a pleasant interactive user experience.

The technology disclosed herein provides systems and methods of providing software compatibility predictions and remediation for industrial systems. One configuration provides a system of providing software compatibility predictions and remediation for industrial systems. The system includes an electronic processor configured to receive a software inventory for an industrial system, the software inventory including one or more pieces of software associated with the industrial system. The electronic processor is also configured to receive compatibility data associated with each piece of software included in the software inventory. The electronic processor is also configured to generate, via a compatibility engine, a compatibility mapping based on the software inventory and the compatibility data. The electronic processor is also configured to determine, based on the compatibility mapping, a set of compatibility statuses associated with the industrial system. The electronic processor is also configured to generate a graphical user interface (GUI) for display, the GUI including the software inventory, the set of compatibility statuses, and an interactive graphical representation of the compatibility mapping. The electronic processor is also configured to, in response to receiving a user interaction with the GUI, dynamically update the GUI based on the user interaction.

Another configuration provides a method of providing software compatibility predictions and remediation for industrial systems. The method includes receiving, with an electronic processor, a software inventory for an industrial system, the software inventory including one or more pieces of software associated with the industrial system. The method also includes receiving, with the electronic processor, compatibility data associated with each piece of software included in the software inventory. The method also includes generating, with the electronic processor, via a compatibility engine, a compatibility mapping based on the software inventory and the compatibility data. The method also includes determining, with the electronic processor, based on the compatibility mapping, a set of compatibility statuses associated with the industrial system. The method also includes generating, with the electronic processor, a graphical user interface (GUI) for display, the GUI including the software inventory, the set of compatibility statuses, and an interactive graphical representation of the compatibility mapping. The method also includes, in response to receiving a user interaction with the GUI, determining, with the electronic processor, a software recommendation for at least one piece of software based on the set of compatibility statuses, and dynamically updating, with the electronic processor, the GUI to include the software recommendation.

Yet another configuration provides a non-transitory, computer-readable medium storing instructions that, when executed by an electronic processor, perform a set of functions. The set of functions includes receiving a software inventory for an industrial system, the software inventory including one or more pieces of software associated with the industrial system. The set of functions also includes receiving compatibility data associated with each piece of software included in the software inventory. The set of functions also includes generating, via a compatibility engine, a compatibility mapping based on the software inventory and the compatibility data. The set of functions also includes determining, based on the compatibility mapping, a set of compatibility statuses associated with the industrial system. The set of functions also includes determining, based at least in part on the set of compatibility statuses, a software recommendation for the industrial system. The set of functions also includes generating a graphical user interface (GUI) for display, the GUI including the software inventory, the set of compatibility statuses, an interactive graphical representation of the compatibility mapping, and the software recommendation. The set of functions also includes, in response to receiving a user interaction with the GUI, performing, based at least in part on the software recommendation, a software update associated with the industrial system.

The foregoing and other aspects and advantages of the present disclosure will appear from the following description. In the description, reference is made to the accompanying drawings which form a part hereof, and in which there is shown by way of illustrations one or more embodiments of the present disclosure. Such configurations do not necessarily represent the full scope of the present disclosure, however, and reference is made therefore to the claims and herein for interpreting the scope of the present disclosure.

BRIEF DESCRIPTION OF DRAWINGS

The present disclosure will be better understood and features, aspects and advantages other than those set forth above will become apparent when consideration is given to the following detailed description thereof. Such detailed description makes reference to the following drawings.

DETAILED DESCRIPTION

Figure 1:
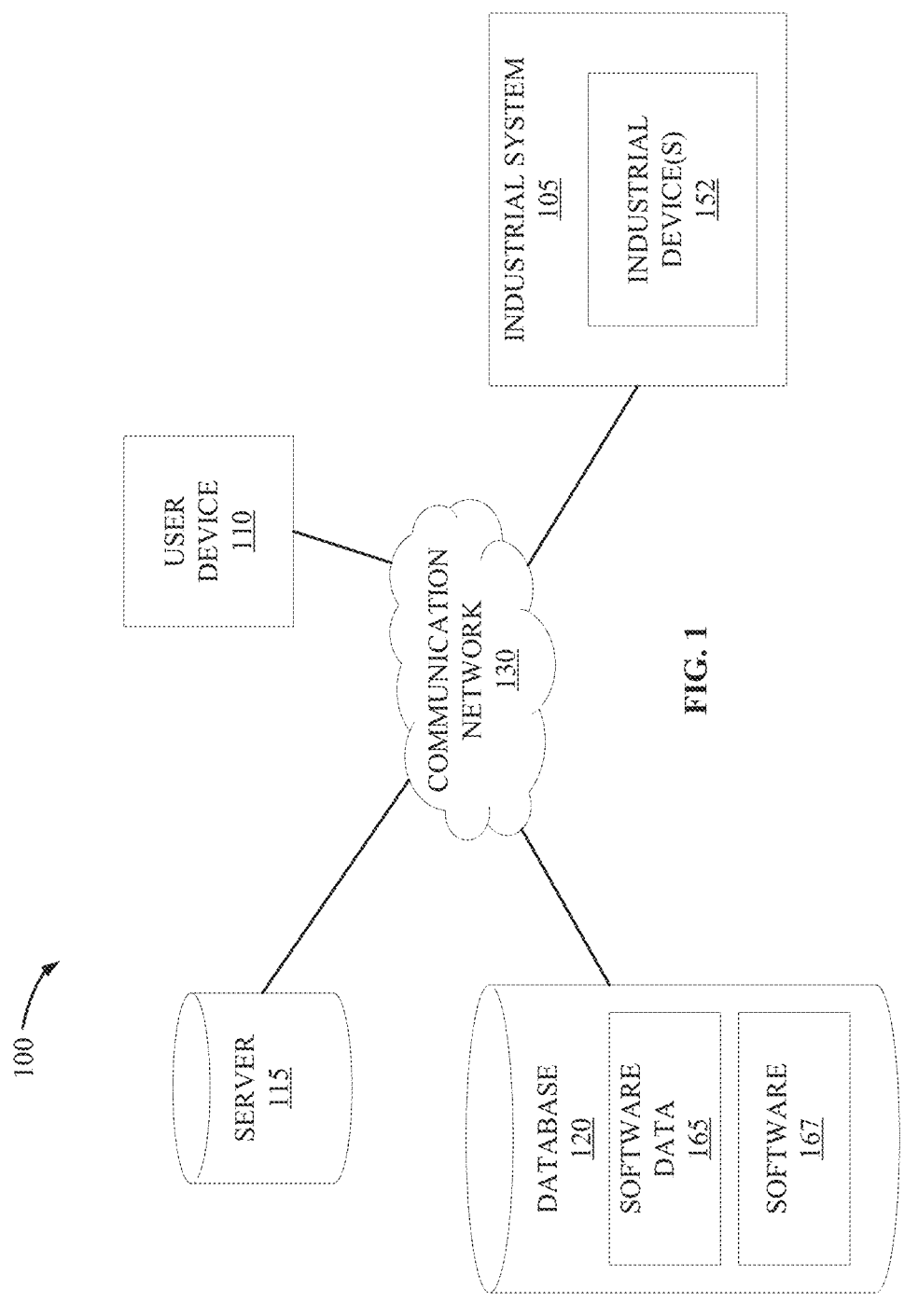
FIG. 1 schematically illustrates a system for providing software compatibility predictions and remediation for industrial systems according to some configurations.

As utilized herein, terms "component," "system," "controller," "device," "manager," and variants thereof are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server may be a component. One or more components may reside within a process and/or thread of execution and a component may be localized on one computer and/or distributed between two or more computers.

The disclosed technology is described with reference to the drawings, wherein like reference numerals are used to refer to like elements throughout. In the following description, for purposes of explanation, numerous specific details are set forth in order to provide a thorough understanding of the disclosed technology. It may be evident, however, that the disclosed technology may be practiced without these specific details. In other instances, well-known structures and devices are shown in block diagram form in order to facilitate describing the disclosed technology.

FIG. 1 schematically illustrates a system 100 for providing software compatibility predictions and remediation for industrial systems according to some configurations. In the illustrated example, the system 100 may include an industrial system 105, a user device 110, a server 115, and a database 120. In some embodiments, the system 100 includes fewer, additional, or different components in different configurations than illustrated in FIG. 1. As one non-limiting example, the system 100 may include multiple industrial systems 105, multiple user devices 110, multiple servers 115, multiple databases 120, or a combination thereof. As another non-limiting example, one or more components of the system 100 may be combined into a single device, such as, e.g., the user device 110 and the server 115, the server 115 and the database 120, the user device 110, the server 115, and the database 120, etc. Alternatively, or in addition, in some configurations, the user device 110, the server 115, the database 120, or a combination thereof may be included as part of the industrial system 105 (e.g., as a component of the industrial system 105).

The industrial system 105, the user device 110, the server 115, the database 120 may communicate over one or more wired or wireless communication networks 130. Portions of the communication networks 130 may be implemented using a wide area network, such as the Internet, a local area network, such as BLUETOOTH® or WI-FI®, and combinations or derivatives thereof. Alternatively, or in addition, in some configurations, components of the system 100 may communicate directly as compared to through the communication network 130. Also, in some configurations, the components of the system 100 may communicate through one or more intermediary devices not illustrated in FIG. 1.

The industrial system 105 may be a manufacturing system, such as, e.g., an industrial automation system or the like. The industrial system 105 may be associated with (or located at) a facility or site. In some configurations, a facility or site may be associated with multiple industrial systems 105 (e.g., a first industrial system, a second industrial system, a third industrial system, etc.). Accordingly, in some configurations, the industrial system 105 may be implemented at a facility. Alternatively, or in addition, in some configurations, the system 100 may include a first industrial system located at a first facility and a second industrial system located as a second facility different from the first facility. The industrial system 105 may be configured to perform one or more industrial processes, manufacturing processes, production processes, or the like. In some configurations, the industrial system 105 may perform a production method that produces goods or products. As one non-limiting example, the industrial system 105 may perform a vehicle manufacturing processor to assemble or produce a vehicle (or various components thereof). As another non-limiting example, the industrial system 105 may perform a food manufacturing process for making a food product. As yet another non-limiting example, the industrial system 105 may perform a pharmaceutical manufacturing process for producing pharmaceuticals.

In the illustrated example, the industrial system 105 may include one or more industrial devices 152 (referred to herein collectively as "the industrial devices 152" and individually as "the industrial device 152"). The industrial device 152 may be a physical piece of equipment included in the industrial system 105. For example, an industrial device 152 may include a pump, a press, a conveyor, a valve, an industrial controller (e.g., a programmable logic controller ("PLC") and the like), a switch, a sensor, a server, a database, a human-machine interface ("HMI"), another piece of equipment that may be used in connection with an associated industrial process or application of the industrial system 105, or the like.

As illustrated in FIG. 1, in some configurations, the system 100 includes the database 120. The database 120 may store software data 165 associated with one or more pieces of software 167. The software data 165 may include, e.g., compatibility data, operating specifications, etc. In some configurations, the database 120 functions as a repository for software data for multiple pieces of software, including software data for one or more versions of each piece of software. For example, a software providing entity may manage the database 120 such that the database 120 includes information associated with each piece of software (including each version of each piece of software) offered by the software providing entity. Accordingly, in some configurations, the database 120 may store a large amount of data associated with each version of each piece of software. In some configurations, the database 120 is a web-based database, a database server, or the like.

Figure 2:
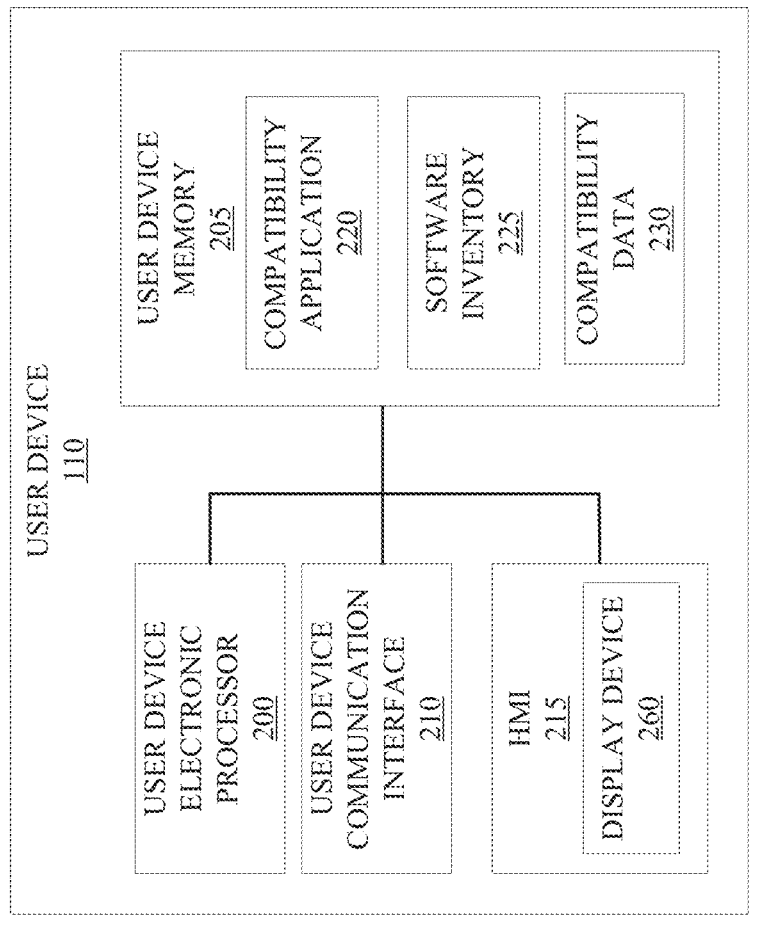
FIG. 2 schematically illustrates a user device included in the system of FIG. 1 according to some configurations.

The user device 110 may be a computing device, such as a desktop computer, a laptop computer, a tablet computer, a terminal, a smart telephone, a smart television, a smart wearable, or another suitable computing device that interfaces with a user. As illustrated in FIG. 2, the user device 110 may include a user device electronic processor 200, a user device memory 205, and a user device communication interface 210, and a human-machine interface ("HMI") 215. The user device electronic processor 200, the user device memory 205, the user device communication interface 210, and the HMI 215 may communicate wirelessly, over one or more communication lines or buses, or a combination thereof. The user device 110 may include additional components than those illustrated in FIG. 2 in various configurations. The user device 110 may also perform additional functionality other than the functionality described herein. Also, the functionality (or a portion thereof) described herein as being performed by the user device 110 may be distributed among multiple devices (e.g., as part of a cloud service or cloud-computing environment), combined with another component of the system 100 (e.g., combined with the server 115, the database 120, another component of the system 100, or the like), or a combination thereof.

The user device communication interface 210 may include a transceiver that communicates with the industrial system 105, the server 115, the database 120, or a combination thereof over the communication network 130 and, optionally, one or more other communication networks or connections. In some configurations, the user device communication interface 210 enables the user device 110 to communicate with the industrial system 105, the server 115, the database 120, or a combination thereof over one or more wired or wireless connections. The user device electronic processor 200 may include a microprocessor, an application-specific integrated circuit ("ASIC"), or another suitable electronic device for processing data, and the user device memory 205 includes a non-transitory, computer-readable storage medium. The user device electronic processor 200 is configured to retrieve instructions and data from the user device memory 205 and execute the instructions.

As one non-limiting example, as illustrated in FIG. 2, the user device memory 205 may include compatibility application 220 (referred to herein as "the application 220"), a software inventory 225, and a compatibility data 230. Although FIG. 2 illustrates the application 220, the software inventory 225, and the compatibility data 230 as being stored in the user device memory 205, in some configurations, the application 220, the software inventory 225, the compatibility data 230, or a combination thereof may be stored external to the user device memory 205, such as in one or more remote devices (e.g., the database 120, the server 115, etc.).

The application 220 may be a software application executable by the user device electronic processor 200 in the example illustrated and as specifically discussed below, although a similarly purposed module may be implemented in other ways in other examples. The user device electronic processor 200 may execute the application 220 to provide software compatibility prediction and remediation for the industrial system 105 (or one or more industrial devices 152 therein), as described in greater detail herein. In some configurations, the application 220 may be a web-browser application that enables access and interaction with a software compatibility platform, such as, e.g., a software compatibility platform associated with the server 115 (e.g., where the software compatibility platform is a web-based service). Alternatively, or in addition, the application 220 may be a dedicated software application that enables access and interaction with a software compatibility platform, such as, e.g., a software compatibility platform associated with (or hosted by) the server 115. Accordingly, in some configurations, the application 220 may function as a software application that enables access to a software compatibility platform or service provided by the server 115.

The software inventory 225 may include software associated with the industrial system 105. In some configurations, the software inventory 225 includes additional data associated with software associated with the industrial system 105, such as, e.g., an installed version, a latest version, a latest patch, Version Lifecycle Management ("VLM") information, Product Safety Advisories (PSA) information, and the like. As one non-limiting example, the software inventory 225 may include a listing of each piece of software executing within the industrial system 105.

The compatibility data 230 may include compatibility information associated with the software inventory 225 (e.g., the one or more pieces of installed software for the industrial system 105). In some configurations, the compatibility data 230 is a subset of the software data 165 stored in the database 120, where the subset of the software data 165 includes software data associated with the one or more pieces of software associated with the industrial system 105 (e.g., the software inventory 225). Accordingly, in some configurations, the compatibility data 230 includes relevant software data sourced from the database 120.

As illustrated in FIG. 2, the user device 110 may include the HMI 215 for interacting with a user. The HMI 215 may include one or more input devices, one or more output devices, or a combination thereof. Accordingly, in some configurations, the HMI 215 allows a user to interact with (e.g., provide input to and receive output from) the user device 110. For example, the HMI 215 may include a keyboard, a cursor-control device (e.g., a mouse), a touch screen, a scroll ball, a mechanical button, a display device (e.g., a liquid crystal display ("LCD")), a printer, a speaker, a microphone, another type of input device, another type of output device, or a combination thereof. As illustrated in FIG. 2, in some configurations, the HMI 215 includes a display device 260. The display device 260 may be included in the same housing as the user device 110 or may communicate with the user device 110 over one or more wired or wireless connections. For example, in some configurations, the display device 260 is a touchscreen included in a laptop computer or a tablet computer. In other configurations, the display device 260 is a monitor, a television, or a projector coupled to a terminal, desktop computer, or the like via one or more cables.

Returning to FIG. 1, the system 100 may also include the server 115. The server 115 may be a computing device. The server 115 may host or otherwise provide at least one software compatibility platform. Accordingly, in some configurations, the server 115 is associated with a software compatibility platform (e.g., included as a component, device, or subsystem of a system providing or hosting a software compatibility platform or service).

Figure 3:
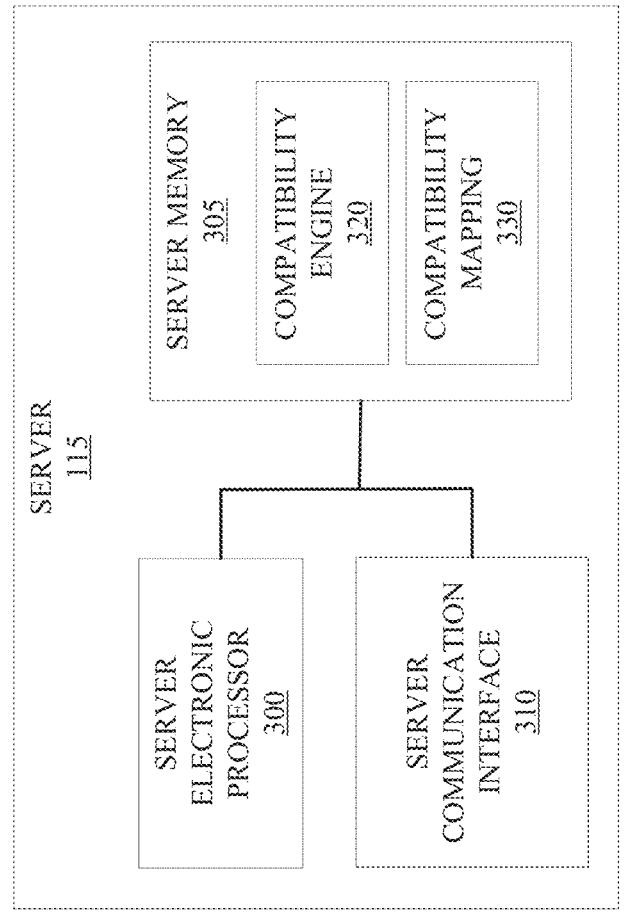
FIG. 3 schematically illustrates a server included in the system of FIG. 1 according to some configurations.

As illustrated in FIG. 3, the server 115 may include a server electronic processor 300, a server memory 305, and a server communication interface 310. The server electronic processor 300, the server memory 305, and the server communication interface 310 may communicate wirelessly, over one or more communication lines or buses, or a combination thereof. The server 115 may include additional components than those illustrated in FIG. 3 in various configurations. The server 115 may also perform additional functionality other than the functionality described herein. Also, the functionality (or a portion thereof) described herein as being performed by the server 115 may be distributed among multiple devices (e.g., as part of a cloud service or cloud-computing environment), combined with another component of the system 100 (e.g., combined with the user device 110, the database 120, another component of the system 100, or the like), or a combination thereof. As one non-limiting example, the server 115 may be a cloud server (e.g., part of a cloud computing environment or network).

The server communication interface 310 may include a transceiver that communicates with the industrial system 105, the user device 110, the database 120, or a combination thereof over the communication network 130 and, optionally, one or more other communication networks or connections. In some configurations, the server communication interface 310 enables the server 115 to communicate with the industrial system 105, the user device 110, the database 120, or a combination thereof over one or more wired or wireless connections. The server electronic processor 300 may include a microprocessor, an ASIC, or another suitable electronic device for processing data, and the server memory 305 includes a non-transitory, computer-readable storage medium. The server electronic processor 300 is configured to retrieve instructions and data from the server memory 305 and execute the instructions.

As one non-limiting example, as illustrated in FIG. 3, the server memory 305 may include a compatibility engine 320. The compatibility engine 320 may be a software application executable by the server electronic processor 300 in the example illustrated and as specifically discussed below, although a similarly purposed module may be implemented in other ways in other examples. In some configurations, the server electronic processor 300 may execute the compatibility engine 320 to provide software compatibility prediction and remediation for the industrial system 105 (or one or more industrial devices 152 therein), as described in greater detail herein. Alternatively, or in addition, in some configurations, the server electronic processor 300 may execute the compatibility engine 320 to determine a compatibility mapping for the industrial system 105, an software recommendation for the industrial system 105 (e.g., a recommended upgrade to an installed piece of software, a recommended new piece of software to install, etc.), and the like, as described in greater detail herein. As illustrated in FIG. 3, in some configurations, the server memory 305 may store a compatibility mapping 330 for the industrial system 105. Alternatively, or in addition, in some configurations, the compatibility mapping 330 may be stored in another location, such as, e.g., the user device memory 205, the database 120, another remote device, etc.

As noted herein, in some configurations, the server 115 may host or otherwise provide at least one software compatibility platform. Accordingly, in some configurations, the server 115 is associated with a software compatibility platform (e.g., included as a component, device, or subsystem of a system providing or hosting a software compatibility platform or service). In such configurations, the server 115 may access or execute the compatibility engine 320, the compatibility mapping 330, or a combination thereof as part of hosting or providing a software compatibility platform or service.

Figure 4:
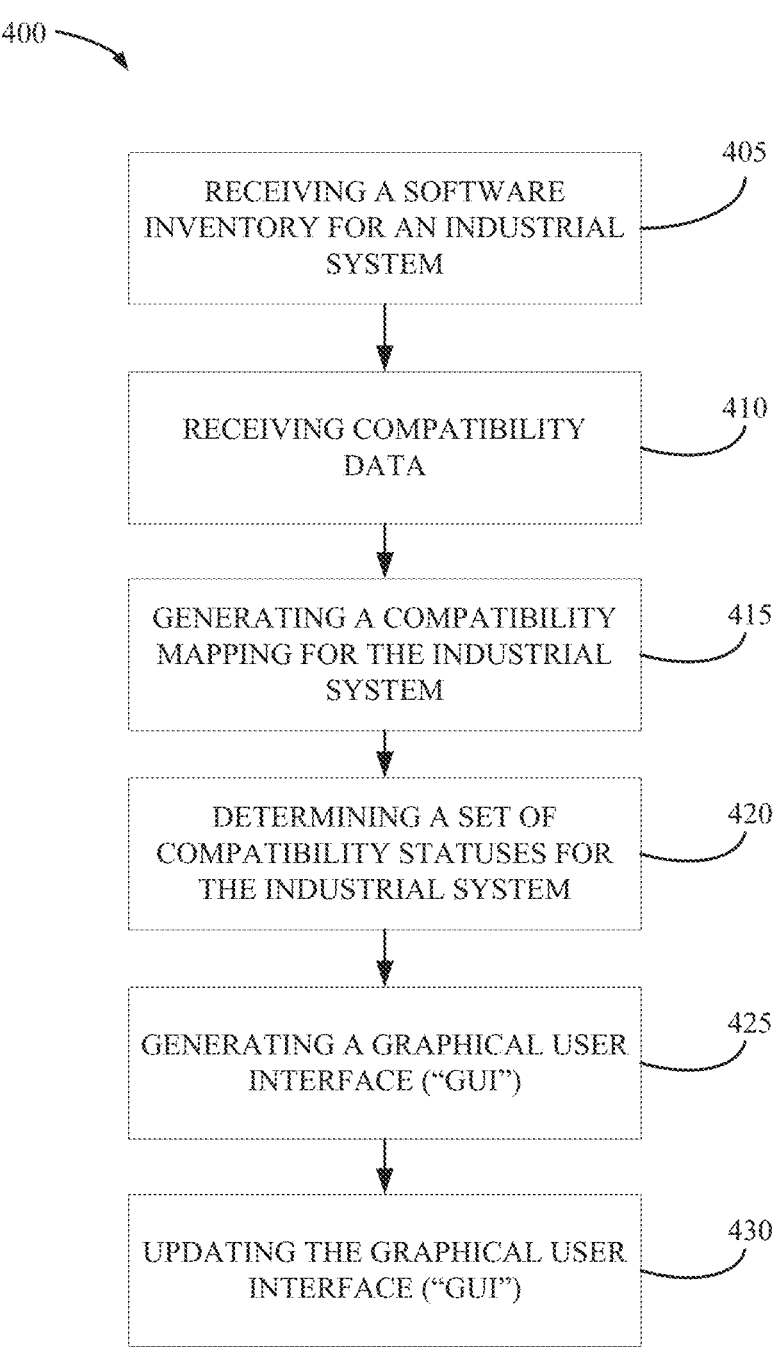
FIG. 4 is a flowchart illustrating a method for providing software compatibility predictions and remediation for industrial systems according to some configurations.

FIG. 4 is a flowchart illustrating a method 400 of providing software compatibility prediction and remediation for the industrial system 105 (or one or more industrial devices 152 therein) according to some configurations. The method 400 is described as being performed by the server 115 and, in particular, the server electronic processor 300. However, as noted herein, the functionality described with respect to the method 400 may be performed by other devices, such as the user device 110, a component included in the industrial system 105, or a combination thereof, distributed among a plurality of devices, such as a plurality of servers included in a cloud service, or a combination thereof.

As illustrated in FIG. 4, the method 400 may include receiving (or accessing), with the server electronic processor 300, the software inventory 225 for the industrial system 105 (at block 405). As noted herein, the software inventory 225 may include one or more pieces of software associated with (or executing with respect to) the industrial system 105. In some configurations, the server electronic processor 300 may receive the software inventory 225 from the user device 110 via the communication network 130. Alternatively, or in addition, in some configurations, the software inventory 225 may be stored locally in the server memory 305. In such confirmations, the server electronic processor 300 may receive (or access) the software inventory 225 from the server memory 305.

The server electronic processor 300 may receive (or access) the compatibility data 230 (at block 410). As noted herein, in some configurations, the compatibility data 230 may be associated with each piece of software included in the software inventory. In some confirmations, the compatibility data 230 may include compatibility data associated with each version of each piece of software associated with the industrial system 105. As one non-limiting example, when the industrial system 105 executes a first version of a first piece of software and a first version of a second piece of software, the compatibility data may include compatibility data for each version of the first piece of software and compatibility data for each version of the second piece of software, not just compatibility data for the first version of the first piece of software and the first version of the second piece of software. In some configurations, the server electronic processor 300 may receive the compatibility data 230 from the user device 110 via the communication network 130. Alternatively, or in addition, in some configurations, the compatibility data 230 may be stored locally in the server memory 305. In such confirmations, the server electronic processor 300 may receive (or access) the compatibility data 230 from the server memory 305.

The server electronic processor 300 may generate (or determine) a compatibility mapping (e.g., the compatibility mapping 330) for the industrial system 105 (at block 415). In some configurations, the server electronic processor 300 generates the compatibility mapping 330 based on the software inventory 225, the compatibility data 230, or a combination thereof. In some configurations, the server electronic processor 300 generates the compatibility mapping 330 by executing the compatibility engine 320. When executed by the server electronic processor 300, the compatibility engine 320 determines compatible software version groupings for the software installed on the industrial system 105 and generates the compatibility mapping 330 based on the compatible software version groupings, where the compatibility mapping 330 links or maps compatible software versions. For instance, the compatibility engine 320 analyzes each software version grouping to determine whether each software version grouping is compatible (or incompatible). When software versions are compatible, the compatibility engine 320 generates a compatibility mapping instance representing a compatibility relationship or link between the software versions included in that software version grouping.

As one non-limiting example, the software inventory 225 may include "Software A" and "Software B" as the installed software for the industrial system 105. Software A may have one version: "Software A_1." Software B may have three versions: "Software B_1," "Software B_2," and "Software B_3." The compatibility data 230 may include compatibility information or specifications for Software A_1, Software B_1, Software B_2, and Software B_3. Following this example, the compatibly engine 320 (as executed by the server electronic processor 300) may process each software version grouping for Software A and Software B, process the compatibility data 230 associated with each of the software versions, and determine whether, based on the compatibility data 230, whether each combination is compatible.

Following this non-limiting example, a first example software version grouping may be Software A_1 and Software B_1. The compatibility engine 320 may access the compatibility data 230 for Software A_1 and Software B_1 and analyze the compatibility data 230 for Software A_1 and Software B_1 to determine whether, based on the compatibility data 230, whether Software A_1 and Software B_1 are compatible. When the compatibility engine 320 determines that Software A_1 and Software B_1 are compatible, the compatibility engine 320 may map (or associate) Software A_1 and Software B_1 (e.g., generate a compatibility mapping instance within the compatibility mapping 330, where the compatibility mapping instance links Software A_1 to Software B_1).

In some configurations, the server electronic processor 300 stores the compatibility mapping 330 in the server memory 305 (as illustrated in FIG. 3). Alternatively, or in addition, in some configurations, the server electronic processor 300 transmits (or otherwise provides) the compatibility mapping 330 to another device via the communication network 130, such as, e.g., the user device 110. Accordingly, in some configurations, the compatibility mapping 330 may be stored in the user device memory 205.

The server electronic processor 300 may determine a set of compatibility statuses for the industrial system 105 (at block 420). In some configurations, the server electronic processor 300 may determine the set of compatibility statuses based on the compatibility mapping 330. In some configurations, the set of compatibility statuses includes a compatibility status for each piece of software installed on the industrial system 105. As one-non limiting example, when the industrial system 105 executes a first piece of software and a second piece of software, the set of compatibility statuses includes a first compatibility status associated with the first piece of software and a second compatibility status associated with the second piece of software.

In some configurations, the server electronic processor 300 stores the set of compatibility statuses in the server memory 305. Alternatively, or in addition, in some configurations, the server electronic processor 300 transmits (or otherwise provides) the set of compatibility statuses to another device via the communication network 130, such as, e.g., the user device 110. Accordingly, in some configurations, the set of compatibility statuses may be stored in the user device memory 205.

The server electronic processor 300 may generate a graphical user interface ("GUI") (at block 425). The GUI may include the software inventory 225, the compatibility data 230, the set of compatibility statuses, the compatibility mapping 330, and the like. In some configurations, the GUI includes an interactive graphical representation of the compatibility mapping 330, as described in greater detail herein. In some configurations, the interactive graphical representation includes a list of available versions for each piece of software associated with the industrial system.

The server electronic processor 300 may transmit (or otherwise provide) the GUI for display. In some configurations, the server electronic processor 300 may transmit the GUI via the communication network 130 to the user device 110. In response to receiving the GUI, the user device 110 may display the GUI to a user of the user device via, e.g., the display device 260 of the user device 110.

In some configurations, the server electronic processor 300 updates the GUI (at block 430). In some configurations, the server electronic processor 300 updates the GUI dynamically (e.g., in real-time or near real-time). As one non-limiting example, the server electronic processor 300 may dynamically update the GUI in response to a user interaction with the GUI (or a component thereof), as described in greater detail herein. As another non-limiting example, the server electronic processor 300 may update the GUI in response to detecting a compatibility fault associated with the industrial system 105, as described in greater detail herein. In some configurations, the server electronic processor 300 detects a compatibility fault based on the software inventory 225, the compatibility data 230, the set of compatibility statuses, the compatibility mapping 330, a combination thereof, or the like.

As another non-limiting example, the server electronic processor 300 may update the GUI in response to detecting a change to the software data 165. In some configurations, the server electronic processor 300 may detect that a new software version is available for a piece of software. The server electronic processor 300 may update the GUI to include a notification or indicator that the new software version is available. In some configurations, the server electronic processor 300 may generate a prompt for display to a user of the user device 110 associated with the new software version. Alternatively, or in addition, the server electronic processor 300 may detect a modification to information associated with a software version. The server electronic processor 300 may update the GUI by updating information included in the GUI such that the information reflects the modification. As such, the server electronic processor 300 may update the GUI (e.g., in real-time or near real-time) such that information included in the GUI is up-to date. In some configurations, the server electronic processor 300 automatically updates the GUI to reflect changes to the software data 165.

In some configurations, the server electronic processor 300 may determine a software recommendation for at least one piece of software based on, e.g., the set of compatibility statuses. A software recommendation may be a recommendation to upgrade an installed piece of software to a new version of the piece of software (e.g., upgrade from a first version to a second version). Alternatively, or in addition, a software recommendation may be a recommendation to install a new piece of software that is not currently installed on the industrial system 105. In some configurations, the software recommendation may include a set of software recommendations. A set of software recommendations may include, e.g., a maximum update, a minimum update, one or more intermediate updates, or a combination thereof. As one non-limiting example, the software recommendation may include a first software recommendation representing a minimum upgrade (e.g., a minimum upgrade to address a compatibility fault or issue experienced by the installed software of the industrial system 105), a second software recommendation representing a maximum upgrade (e.g., a maximum upgrade based on available pieces of software, software versions, etc.), and a third software recommendation representing an intermediate upgrade between the minimum upgrade and the maximum upgrade.

In some configurations, the server electronic processor 300 may receive (or detect) activation of an update constraint associated with at least one piece of installed software of the industrial system 105. The update constraint may identify a piece of software that is prevented from being updated. In some configurations, the server electronic processor 300 may determine the software recommendation based on the activation of the update constraint. Alternatively, or in addition, in some configurations, the server electronic processor 300 may update the GUI (e.g., the interactive graphical representation of the compatibility mapping 330) based on the activation of the update constraint.

In some configurations, the server electronic processor 300 may facilitate the deployment and performance of a software update or upgrade. In some configurations, the server electronic processor 300 may facilitate the deployment or perform a software update in response to a user interaction with the GUI. As one non-limiting example, in some configurations, the server electronic processor 300 may include a GUI component that, when activated or interacted with by a user, triggers the deployment and installation of a software update or upgrade. In some configurations, the software update or upgrade is associated with one or more software recommendations. In some configurations, the server electronic processor 300 may access software associated with the software update. In some configurations, when the software associated with the software update is stored locally in the server memory 305, the server electronic processor 300 may access the software associated with the software update from the server memory 305 and transmit (or otherwise provide) the software to the user device 110 for deployment within the industrial system 105, to the industrial system 105 directly, or the like. Alternatively, or in addition, in some configurations, when the software associated with the software update is stored in an external device, such as the software 167 (or a portion thereof) of the database 120, the server electronic processor 300 may access the software 167 (or a portion thereof) from the database 120, and transmit (or otherwise provide) the software to the user device 110 for deployment within the industrial system 105, to the industrial system 105 directly, or the like.

Figure 5:
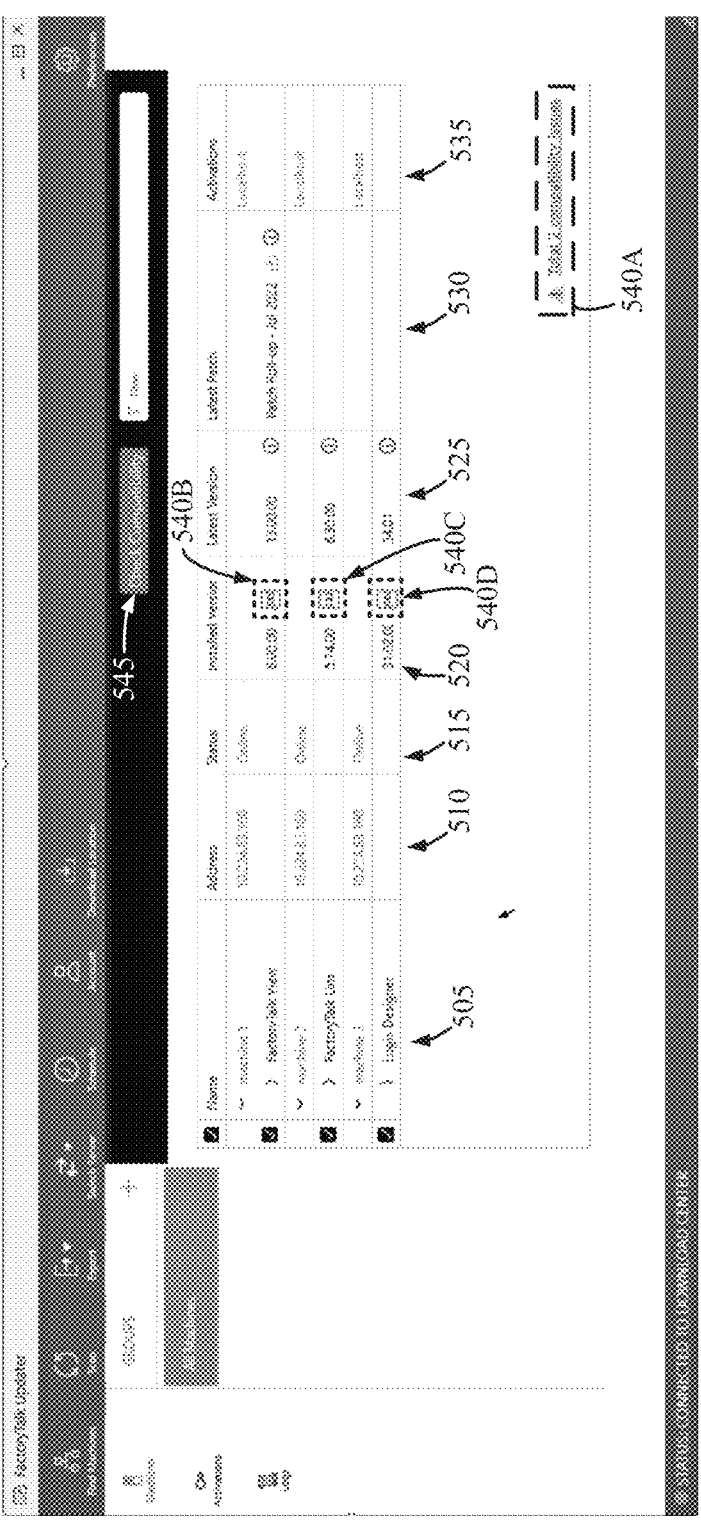
FIG. 5 is an example graphical user interface according to some configurations.

FIGS. 5-12 illustrate example GUIs generated by the server electronic processor 300 according to some configurations. As one non-limiting example, FIG. 5 illustrates an example GUI 500 according to some configurations. As illustrated in the example of FIG. 5, the GUI 500 includes a list of names 505 for the industrial devices 152 included in the industrial system 105. In the example illustrated in FIG. 5, the list of names 505 includes "machine 1," "machine 2," and "machine 3." In some configurations, as illustrated in FIG. 5, the GUI 500 may also include an address indicator 510, a status indicator 515, an installed version indicator 520, a latest version indicator 525, a latest patch 530 indicator, an activation indication 535, or a combination thereof.

As illustrated in FIG. 5, the GUI 500 may also include one or more compatibility warnings or alerts (represented in FIG. 5 by reference numerals 540A, 540B, 540C, and 540D). The GUI 500 may include the compatibility warning(s) 540A, 540B, 540C, and 540D when a compatibility fault or issue is detected with respect to the installed software of the industrial system 105 (e.g., when at least one version of a piece of software installed for the industrial system 105 is incompatible with at least one other version of another piece of software installed for the industrial system 105). In some configurations, the server electronic processor 300 may detect the occurrence of a compatibility fault or issue based on the software inventory 225, the compatibility data 230, the set of compatibility statuses, the compatibility mapping 330, or a combination thereof. In some configurations, the compatibility warning(s) 540A, 540B, 540C, and 540D includes information associated with a compatibility fault or issue. As one non-limiting example, in the example of FIG. 5, the compatibility warning 540A indicates that there are two compatibility issues associated with the installed software of the industrial system 105. In some configurations, the position of the compatibility warning(s) 540A, 540B, 540C, and 540D on the GUI 500 may indicate which industrial device 152 is associated with or experiencing a compatibility fault or issue. As one non-limiting example, as illustrated in the example of FIG. 5, the GUI 500 includes compatibility warnings 540B, 540C, and 540D, which are each positioned proximate to (or associated with) an industrial device (e.g., proximate to an associated installed version indication 520).

In some configurations, the compatibility warning(s) 540A, 540B, 540C, and 540D may be interactive GUI components, such that a user may interact with the compatibility warning(s) 540A, 540B, 540C, and 540D. In some configurations, the server electronic processor 300 may generate a compatibility issue GUI in response to a user interaction with the compatibility warning(s) 540A, 540B, 540C, and 540D. FIGS. 6-9 illustrate example compatibility issue GUIs according to some configurations.

Figure 6:
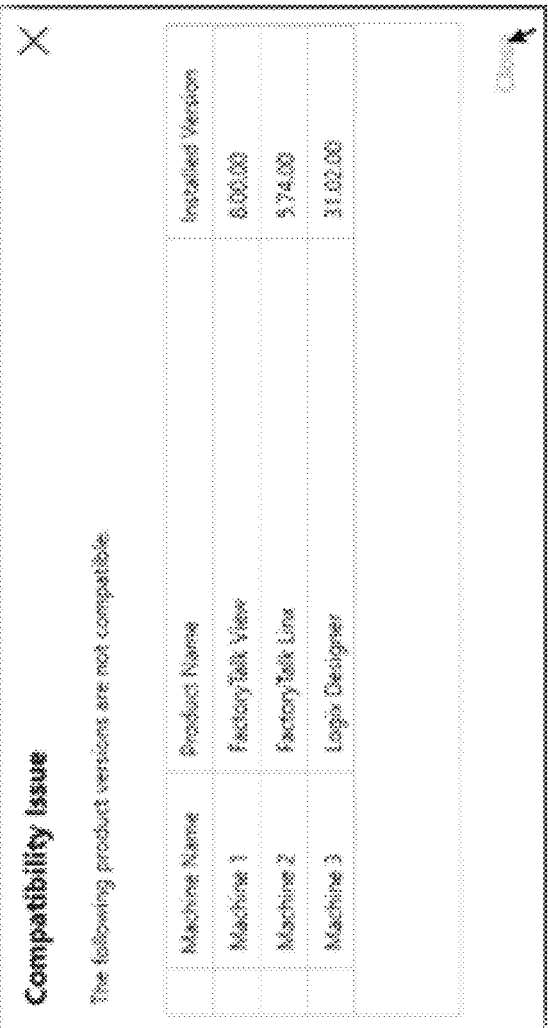
FIGS. 6-9 are example compatibility issue graphical user interfaces according to some configurations.

FIG. 6 illustrates an example compatibility issue GUI 600 generated in response to a user interaction with the compatibility warning 540A according to some configurations. As illustrated in FIG. 6, the compatibility issue GUI 600 includes information associated with a compatibility fault or issue. In the example of FIG. 6, the compatibility issue GUI 600 identifies information related to a machine name, a product name, and an installed version. In some configurations, the compatibility issue GUI 600 of FIG. 6 is a summary GUI of all compatibility faults or issues associated with the installed software of the industrial system 105. In some configurations, the compatibility issue GUI 600 may include additional, less, or different information related to the compatibility fault or issue.

Figure 7:
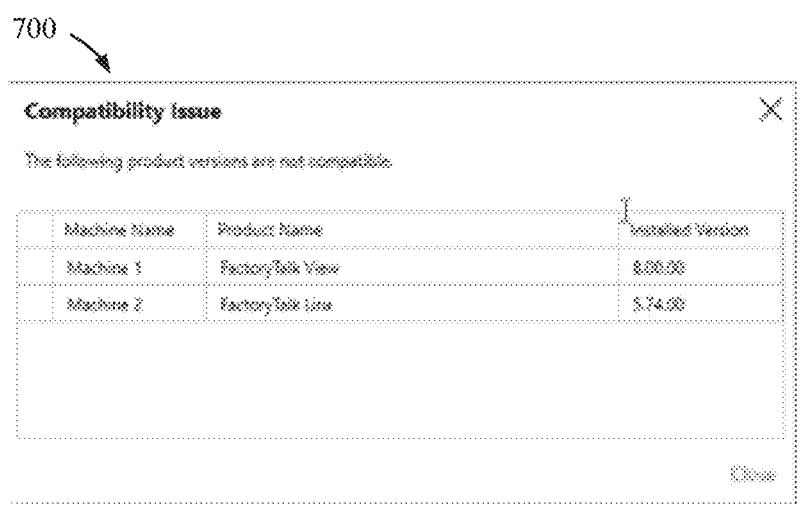

FIG. 7 illustrates an example compatibility issue GUI 700 generated in response to a user interaction with the compatibility warning 540B according to some configurations. As illustrated in FIG. 7, the compatibility issue GUI 700 includes information associated with a compatibility fault or issue specific to the installed software of "machine 1." In the example of FIG. 7, the compatibility issue GUI 700 identifies information related to a machine name, a product name, and an installed version. In some configurations, the compatibility issue GUI 700 may include additional, less, or different information related to the compatibility fault or issue.

Figure 8:
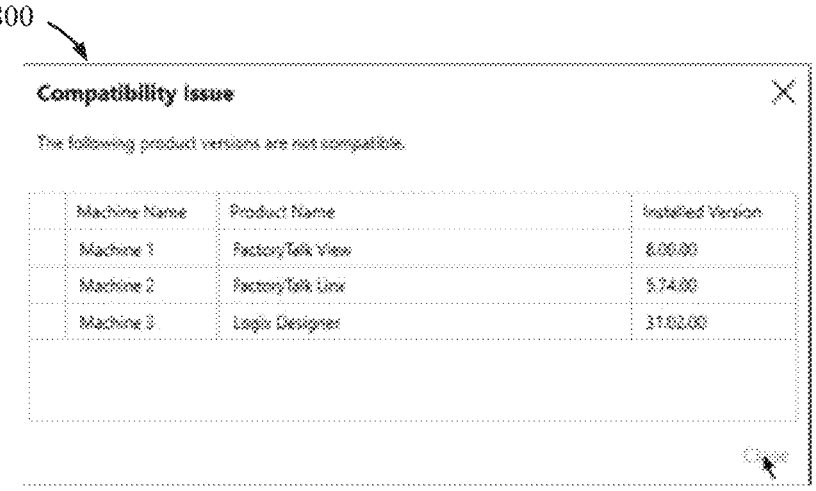

FIG. 8 illustrates an example compatibility issue GUI 800 generated in response to a user interaction with the compatibility warning 540C according to some configurations. As illustrated in FIG. 8, the compatibility issue GUI 800 includes information associated with a compatibility fault or issue specific to the installed software of "machine 2." In the example of FIG. 8, the compatibility issue GUI 800 identifies information related to a machine name, a product name, and an installed version. In some configurations, the compatibility issue GUI 800 may include additional, less, or different information related to the compatibility fault or issue.

Figure 9:
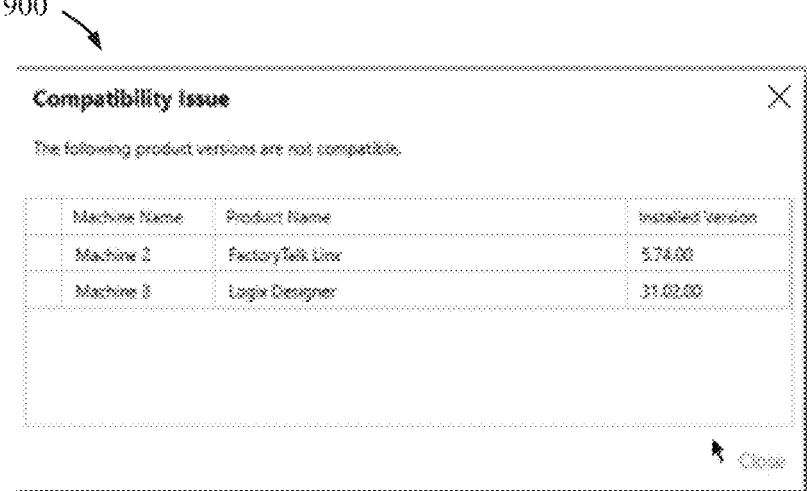

FIG. 9 illustrates an example compatibility issue GUI 900 generated in response to a user interaction with the compatibility warning 540D according to some configurations. As illustrated in FIG. 9, the compatibility issue GUI 900 includes information associated with a compatibility fault or issue specific to the installed software of "machine 3." In the example of FIG. 9, the compatibility issue GUI 900 identifies information related to a machine name, a product name, and an installed version. In some configurations, the compatibility issue GUI 900 may include additional, less, or different information related to the compatibility fault or issue.

Returning to FIG. 5, in some configurations, the GUI 500 includes a check compatibility GUI component 545 (represented in FIG. 5 as a button). The check compatibility GUI component 545 may be an interactive GUI component. A user may interact with the check compatibility GUI component 545, such as, e.g., with a mouse-click performed with a cursor device. In response to interacting with the check compatibility GUI component 545, the server electronic processor 300 may be triggered to check compatibility of the installed software of the industrial system 105. In some configurations, the server electronic processor 300 may check compatibility of the installed software of the industrial system 105 as described in greater detail herein (e.g., using the software inventory 225, the compatibility data 230, the set of compatibility statuses, the compatibility mapping 330, a combination thereof, or the like).

Figure 10:
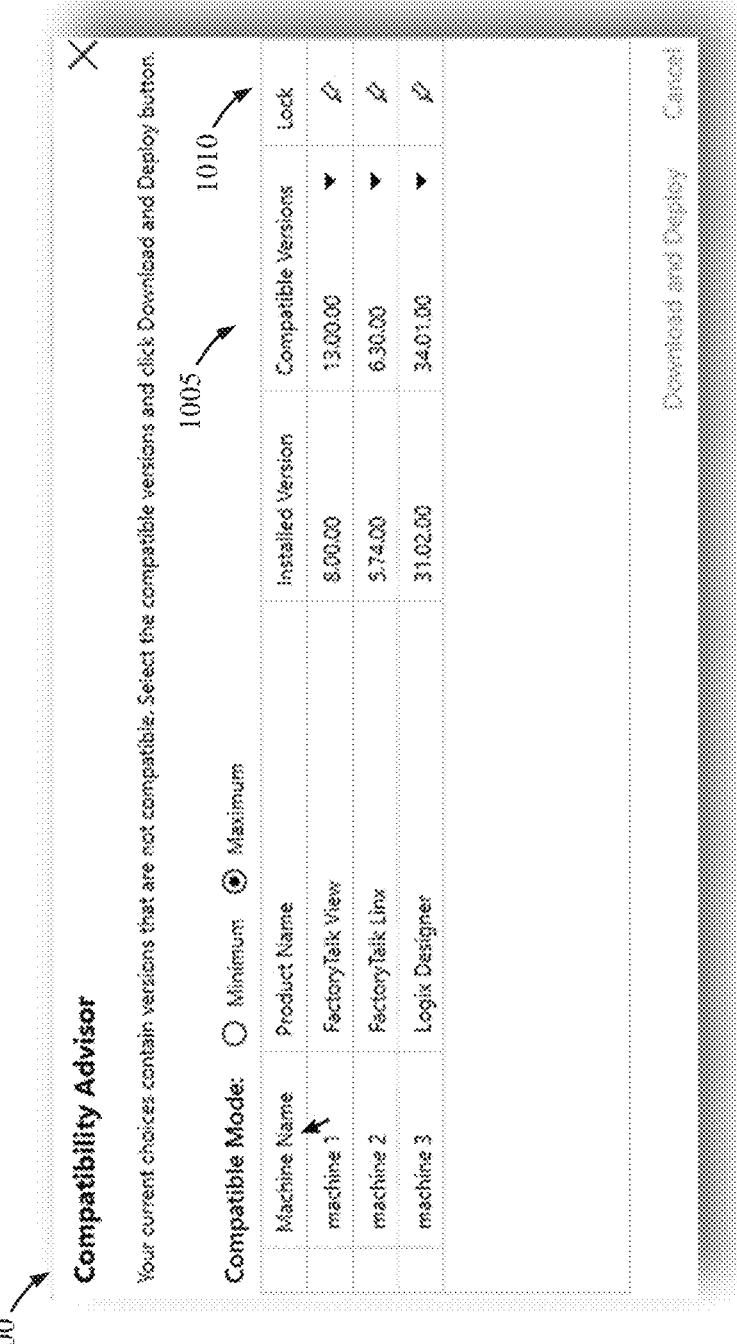
FIGS. 10-12 are an example compatibility advisor graphical user interfaces according to some configurations.

In some configurations, in response to detecting an interaction with the check compatibility GUI component 545, the server electronic processor 300 may generate a compatibility advisor GUI. FIG. 10 illustrates an example compatibility advisor GUI 1000 according to some configurations. As illustrated in the example of FIG. 10, the compatibility advisor GUI 1000 identifies information related to a machine name, a product name, and an installed version. As further illustrate din the example of FIG. 10, the compatibility advisor GUI 1000 includes an interactive graphical representation of a compatibility mapping (e.g., the compatibility mapping 330). The interactive graphical representation of the compatibility mapping 330 is represented in FIG. 10 as a series of drop-down menus (represented in FIG. 10 by reference numeral 1005), where each drop-down menu includes a listing of versions of the associated piece of software. Accordingly, a user may interact with a drop-down menu by selecting a version from the listing of versions. In response to a user selection of a software version, the server electronic processor 300 may dynamically update software versions included in the other drop-down menus.

Accordingly, in some configurations, the interactive graphical representation 1005 includes a list of available versions for each piece of software associated with the industrial system. In some configurations, when a user interacts with the interactive graphical representation 1005, the server electronic processor 300 may dynamically update the compatibility advisor GUI 1000 by modifying the interactive graphical representation 1005.

Figure 11:
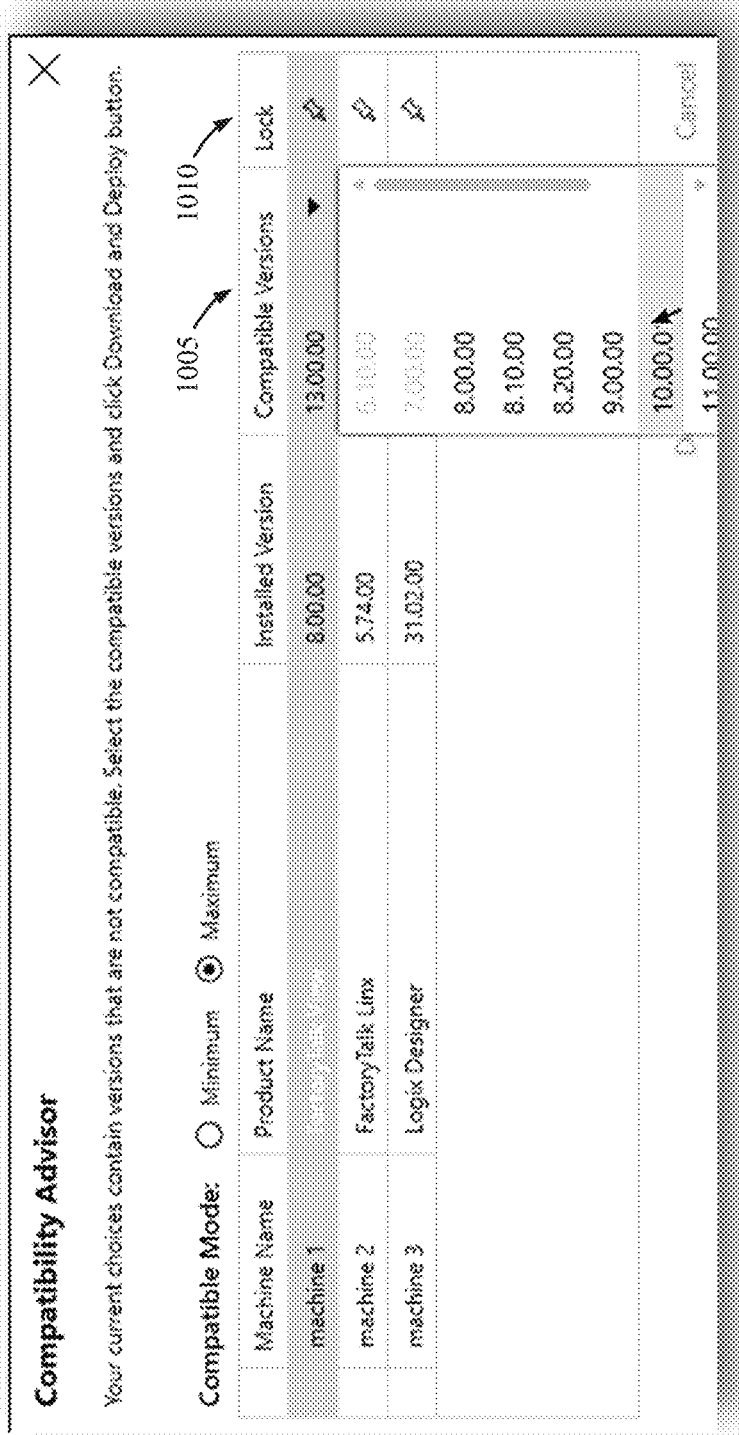

In some configurations, a user interaction with the compatibility advisor GUI 1000 may include a selection, from at least one drop-down menu included in the interactive graphical representation 1005, of a new version for a piece of software included in the software inventory 225, where the new version is different than an installed version of the piece of software, as illustrated in FIG. 11. The server electronic processor 300 may dynamically update the compatibility advisor GUI 1000 by modifying the interactive graphical representation 1005 based on the new version. In some configurations, the server electronic processor 300 may modify the interactive graphical representation 1005 to indicate a first version grouping and a second version grouping, where the first version grouping includes software versions that are compatible with the new version and the second version grouping includes software versions that are incompatible with the new version. In some configurations, the server electronic processor 300 may modify the interactive graphical representation 1005 to indicate the first version grouping and the second version grouping by altering a display parameter of each software version such that the first version grouping is visually distinguished from the second version grouping in the interactive graphical representation.

As one non-limiting example, with respect to FIG. 11, the server electronic processor 300 may modify interactive graphical representation 1005 by modifying the listing of software versions in the drop-down menu such that those software versions that are not compatible with the new version are greyed out while those software versions that are compatible with the new version are not greyed out. Alternatively, or in addition, in some configurations, the server electronic processor 300 may disable user selection of those software versions that are not compatible with the new version may enable user selection of those software versions that are compatible with the new version.

Figure 12:
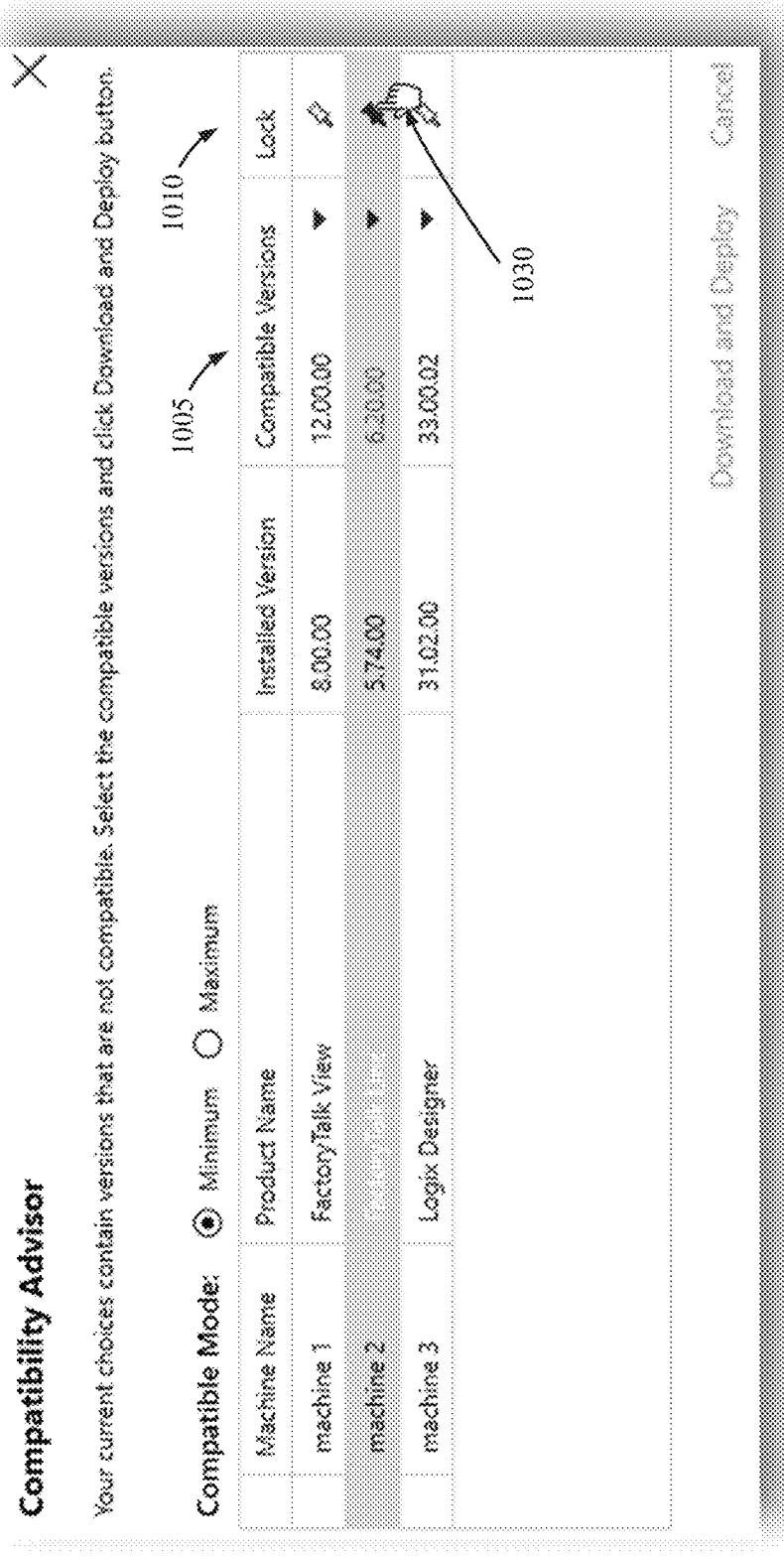

Returning to FIG. 10, in some configurations, the compatibility advisor GUI 1000 may include an update constraint GUI component 1010 for each of the installed pieces of software of the industrial system 105. A user may interact with the update constraint GUI component 1010 to lock or prevent a change to a piece of software associated with the update constraint GUI component 1010 (e.g., an update constraint). As one non-limiting example, as illustrated in FIG. 12, when a user interacts with (represented in FIG. 12 by reference numeral 1030) the update constraint GUI component 1010 associated with "machine 2," the server electronic processor 300 may determine a software recommendation, update the interactive graphical representation 1005, or the like based on the activation of the update constraint GUI component 1010. Accordingly, in some configurations, a user interaction may include activating an update constraint for at least one piece of software, where the upgrade constrain prevents an associated piece of software from being updated or upgraded. In such configurations, the server electronic processor 300 may determine a software recommendation, update the interactive graphical representation 1005, or the like based on the activation of the update constraint.

What has been described above includes examples of the disclosed technology. It is, of course, not possible to describe every conceivable combination of components or methodologies for purposes of describing the disclosed technology, but one of ordinary skill in the art may recognize that many further combinations and permutations of the disclosed technology are possible. Accordingly, the disclosed technology is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed technology. In this regard, it will also be recognized that the disclosed technology includes a system as well as a computer-readable medium having computer-executable instructions for performing the acts and/or events of the various methods of the disclosed technology.

In addition, while a particular feature of the disclosed technology may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system for software compatibility prediction and remediation for industrial systems, the system comprising:
    an electronic processor configured to:
        receive a software inventory for an industrial system, the software inventory including one or more pieces of software associated with the industrial system;
        receive compatibility data associated with each piece of software included in the software inventory;
        generate, via a compatibility engine, a compatibility mapping based on the software inventory and the compatibility data;
        determine, based on the compatibility mapping, a set of compatibility statuses associated with the industrial system;
        generate a graphical user interface (GUI) for display, the GUI including the software inventory, the set of compatibility statuses, and an interactive graphical representation of the compatibility mapping; and
        in response to receiving a user interaction with the GUI, determine a software recommendation for at least one piece of software based on the set of compatibility statuses and an update constraint for a first piece of software, the update constraint preventing the first piece of software from being updated, and dynamically update the GUI based on the user interaction.

2. The system of claim 1, wherein the interactive graphical representation includes a list of available versions for each piece of software associated with the industrial system.

3. The system of claim 1, wherein the user interaction with the GUI includes a selection, from the interactive graphical representation, of a new version for a first piece of software included in the software inventory, the new version different than an installed version of the first piece of software.

4. The system of claim 3, wherein the electronic processor is configured to dynamically update the GUI by modifying the interactive graphical representation based on the new version.

5. The system of claim 4, wherein the electronic processor is configured to modify the interactive graphical representation to indicate a first version grouping and a second version grouping, wherein the first version grouping includes software versions that are compatible with the new version and the second version grouping includes software versions that are incompatible with the new version.

6. The system of claim 5, wherein the electronic processor is configured to modify the interactive graphical representation to indicate the first version grouping and the second version grouping by altering a display parameter of each software version such that the first version grouping is visually distinguished from the second version grouping in the interactive graphical representation.

7. The system of claim 1, wherein the software recommendation includes a first software recommendation representing a minimum upgrade and a second software recommendation representing a maximum upgrade.

8. The system of claim 1, wherein the user interaction includes activating the update constraint for the first piece of software.

9. The system of claim 8, wherein the electronic processor is configured to determine the software recommendation based on the activation of the update constraint.

10. The system of claim 8, wherein the electronic processor is configured to dynamically update the GUI based on the activation of the update constraint for the first piece of software.

11. The system of claim 1, wherein the industrial system includes a plurality of industrial subsystems, wherein a first industrial subsystem of the plurality of industrial subsystems is associated with a first geographical location and a second industrial subsystem of the plurality of industrial subsystems is associated with a second geographical location different from the first geographical location.

12. The system of claim 1, wherein the electronic processor is further configured to:

determine, based on the set of compatibility status, a compatibility fault associated with at least two pieces of software executing within the industrial system; and generate and provide a warning for display via the GUI, the warning including an indication of the compatibility fault.

13. The system of claim 1, wherein the update constraint prevents a manual update and an automatic update of the first piece of software.

14. A method for software compatibility prediction and remediation for industrial systems, the system comprising:

receiving, with an electronic processor, a software inventory for an industrial system, the software inventory including one or more pieces of software associated with the industrial system;

receiving, with the electronic processor, compatibility data associated with each piece of software included in the software inventory;

generating, with the electronic processor, via a compatibility engine, a compatibility mapping based on the software inventory and the compatibility data;

determining, with the electronic processor, based on the compatibility mapping, a set of compatibility statuses associated with the industrial system;

generating, with the electronic processor, a graphical user interface (GUI) for display, the GUI including the software inventory, the set of compatibility statuses, and an interactive graphical representation of the compatibility mapping;

receiving, with the electronic processor, an activation of an update constraint for a first piece of software, the update constraint preventing the first piece of software from being updated;

determining, with the electronic processor, a software recommendation for at least one piece of software based on the set of compatibility statuses and the update constraint; and dynamically updating, with the electronic processor, the GUI to include the software recommendation.

15. The method of claim 14, further comprising:

performing a software upgrade to at least one piece of software.

16. The method of claim 15, wherein performing the software upgrade includes receiving, via the GUI, an upgrade selection associated with the software recommendation, wherein the software upgrade is based on the software recommendation.

17. The method of claim 14, wherein determining the compatibility mapping includes determining a custom compatibility mapping based on the industrial system.

18. A non-transitory, computer-readable medium storing instructions that, when executed by an electronic processor, perform a set of functions, the set of functions comprising:

receiving a software inventory for an industrial system, the software inventory including one or more pieces of software installed within the industrial system;

receiving compatibility data associated with each piece of software included in the software inventory;

generating, via a compatibility engine, a compatibility mapping based on the software inventory and the compatibility data;

determining, based on the compatibility mapping, a set of compatibility statuses associated with the industrial system;

determining, based on the set of compatibility statuses and an update constraint for a first piece of software, a software recommendation for the industrial system, wherein the update constraint prevents the first piece of software from being updated;

generating a graphical user interface (GUI) for display, the GUI including the software inventory, the set of compatibility statuses, an interactive graphical representation of the compatibility mapping, and the software recommendation; and in response to receiving a user interaction with the GUI, performing, based at least in part on the software recommendation, a software update associated with the industrial system.

19. The computer readable medium of claim 18, wherein the set of functions further includes:

receiving an activation of the update constraint for the first piece of software.

20. The computer readable medium of claim 18, wherein the set of functions further includes:

determining, based on the set of compatibility status, a compatibility fault associated with at least two pieces of software associated with the industrial system; and generating and providing a warning for display via the GUI, the warning including an indication of the compatibility fault.

* * * * *